United States Patent
Mogi et al.

(10) Patent No.: US 7,348,540 B2
(45) Date of Patent: Mar. 25, 2008

(54) HOLDER FOR OPTICAL MODULES, OPTICAL MODULE AND OPTICAL CONNECTOR

(75) Inventors: Toshiyuki Mogi, Shibuya-ku (JP); Kazutaka Shito, Hidaka (JP); Takashi Kamitakahara, Kashiwa (JP); Takayuki Nakamura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/604,989

(22) Filed: Nov. 28, 2006

(65) Prior Publication Data

US 2007/0131856 A1 Jun. 14, 2007

(30) Foreign Application Priority Data

Dec. 9, 2005 (JP) .............................. 2005-356982
Sep. 7, 2006 (JP) .............................. 2006-243133

(51) Int. Cl.
*H01J 10/14* (2006.01)
*H01J 5/02* (2006.01)

(52) U.S. Cl. .................. 250/227.11; 250/239; 385/93

(58) Field of Classification Search ........... 250/227.11, 250/239; 385/93
See application file for complete search history.

(56) References Cited

U.S. PATENT DOCUMENTS 6,942,398 B2 * 9/2005 Morioka .................. 385/93
7,156,563 B2 * 1/2007 Morioka .................. 385/93
2003/0044126 A1 * 3/2003 Kawano et al. ........... 385/88
2004/0190837 A1 * 9/2004 Morioka .................. 385/93
2004/0264890 A1 * 12/2004 Morioka .................. 385/93
2006/0002667 A1 * 1/2006 Aronson .................. 385/93

FOREIGN PATENT DOCUMENTS

JP 6-300943 10/1994
JP 7-134225 5/1995

* cited by examiner

*Primary Examiner*—John R. Lee
(74) *Attorney, Agent, or Firm*—William L. Androlia; H. Henry Koda

(57) ABSTRACT

An optical module holder in which an optical transmission line attaching section for attaching an end section of a light transmission line, a photoelectric element attaching section for attaching a photoelectric element including at least one of a light-emitting element or a light-receiving element, and a wall section connecting the optical transmission line attaching section and the photoelectric element attaching section are formed integrally, and a lens for optically joining the photoelectric element and the optical transmission line is formed integrally with the wall section, so that the convex surface of the lens is on the photoelectric element side, facing the photoelectric element attached to the photoelectric attaching section, wherein one or a plurality of concave sections are formed as grooved sections on the wall section so as to surround the lens.

7 Claims, 11 Drawing Sheets

HOLDER FOR OPTICAL MODULES, OPTICAL MODULE AND OPTICAL CONNECTOR

BACKGROUND OF THE INVENTION

1. Field of the Invention

The present invention relates to an optical module holder used in optical fiber communication. In particular, the present invention relates to an optical module holder, an optical module, and an optical connector, in which the optical module is formed integrally with a lens.

2. Description of the Related Art

In recent years, with the increase in the speed and capacity of data communication, the demand for optical fiber communication technology using optical fiber is rising. In such optical fiber communication, the transmitting end converts a signal to be transmitted to an electrical signal. An optical signal formed from light emitted from a light source for communication, such as a semiconductor laser or a light-emitting diode, is transmitted to the receiving end by an optical fiber transmission line, according to the electrical signal. A light detector receives the transmitted optical signal and converts the optical signal back to the electrical signal. Then, the light detector converts the electrical signal to the required signal. An optical module is used to convert the optical signal delivered by the optical fiber transmission line to the electrical signal or convert the electrical signal to the optical signal and lead the signal out to the optical fiber transmission line in this way. Such an optical module for optical fiber communication includes a photoelectric conversion element package (for example, a package holding a semiconductor light-emitting element, such as a semiconductor laser, or a semiconductor light-receiving element, such as a photo diode), a ferrule that holds the end surface of the optical fiber, a lens that optically joins the photoelectric conversion element within the photoelectric conversion element package and the optical fiber held by the ferrule and makes possible optical communication, and a holder that holds the photoelectric element package, the ferrule, and the lens.

As such an optical module, for example, a following semiconductor element module is proposed (for example, refer to Patent Literature 1). In the semiconductor element module, an engaging section onto which a ferrule for positioning the optical fiber is engaged is formed on one end of a sleeve. An element holding section is formed on the other end of the sleeve on the same axis as the engaging section. A lens holding section is formed between the engaging section and the element holding section. A semiconductor light-emitting element or a light-receiving element is held in the element holding section. A light-collecting lens is held in the lens holding section. However, in this optical module, the semiconductor light-emitting element or light-receiving element, the ferrule, and the lens are separate components. Therefore, when attaching the components to the holder, aligning is required to be performed so that the optical axis of each component matches. The alignment is difficult and, therefore, operating efficiency is poor.

In order to solve this problem, an optically-coupled device module in which the lens and the holder are formed integrally is proposed (for example, refer to Patent Literature 2). In this optical module, it is unnecessary to align the positions of the optical axis of the lens and the axis of the holder. Therefore, the assembly operation of the optical module is facilitated, and the production efficiency of the optical module can be improved.

[Patent Literature 1] Japanese Patent Unexamined Publication No. Heisei 6-300943 (paragraph numbers 0010 and 0018)

[Patent Literature 2] Japanese Patent Unexamined Publication No. Heisei 7-134225 (paragraph numbers 0014 to 0020)

However, as in Patent Literature 2, in the optical module including the holder formed integrally with the lens, the thickness of the holder is uneven. Thin areas are pulled by thick areas due to mold shrinkage, and the holder is unevenly deformed. In particular, the lens area to be the optical path becomes thicker than other areas, increasing the uneven deformation caused by mold shrinkage. As a result, the optical performance of the optical module may be degraded because of such uneven deformation.

In light of such conventional problems, an object of the present invention is to provide an optical module holder that can reduce uneven deformation caused by molding shrinkage, even when the holder and the lens are integrated.

SUMMARY OF THE INVENTION

In order to solve the above-described problems, in an optical module holder according to the present invention, an optical transmission line attaching section, a photoelectric element attaching section, and a wall section are formed integrally. The optical transmission line attaching section is used to attach the end section of the light transmission line. The photoelectric element attaching section is used to attach a photoelectric element including at least one of a light-emitting element or a light-receiving element. The wall section connects the optical transmission line attaching section and the photoelectric element attaching section. In addition, in the optical module holder, a lens for optically joining the photoelectric element and the optical transmission line is formed integrally with the wall section, so that the convex surface of the lens is on the photoelectric element side, facing the photoelectric element attached to the photoelectric attaching section. Furthermore, in the optical module holder, one or a plurality of concave sections is formed on the wall section so as to surround the lens. The concave sections are formed as grooved sections.

In the optical module holder, the optical transmission line attaching section and the photoelectric element attaching section are preferably formed from cylindrical components that mutually extend in the same axis direction. The wall section is preferably formed from a discoid component that is thicker than the optical transmission line attaching section and the photoelectric element attaching section. The lens is preferably formed in the center area of the wall section. The grooved section is preferably formed a predetermined distance away from the lens. The grooved section is preferably a plurality of concave sections disposed a predetermined distance apart from each other, symmetrical to the optical axis of the lens and in the circumference direction of the lens. Furthermore, the grooved section is preferably a plurality of roughly-fan-shaped concave sections or one circular concave section.

The optical module according to the present invention includes the above-described optical module holder and a photoelectric element attached to the optical module holder. Furthermore, an optical connector according to the present invention includes the optical module and a housing that houses the optical module.

According to the present invention, an optical module holder that can reduce uneven deformation caused by molding shrinkage, even when the optical module holder is formed integrally with a lens, is provided.

DETAILED DESCRIPTION OF THE PREFERRED EMBODIMENT

First Embodiment

Figure 1A:
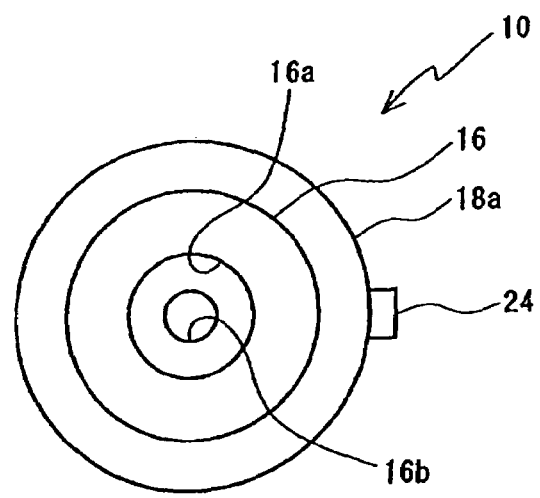
FIG. 1A is a planar view of an optical module holder according to a first embodiment of the present invention.
Figure 1B:
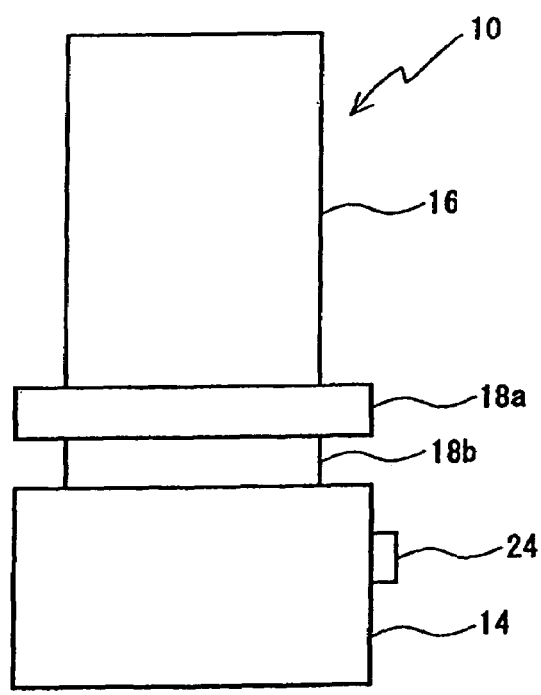
FIG. 1B is a side view of the optical module holder in FIG. 1A.

A first embodiment of an optical module holder according to the present invention will be described in detail hereinafter, with reference to the attached drawings.

FIG. 1A to FIG. 1D show a first embodiment of an optical module holder according to the present invention. An optical module holder 10 according to the present embodiment is formed integrally by injection molding of transparent resin material, such as polyetherimide (PEI), polycarbonate (PC), or polymethylmethacrylate (PMMA). As shown in FIG. 1A to FIG. 1D the optical module holder 10 includes a cylindrical first cylinder section 14, a cylindrical second cylinder section 16, and a discoid partition wall section 18. The first cylinder section 14 and the second cylinder section 16 are respectively disposed surrounding an axis 12 (refer to FIG. 1D) (so that the axis 12 is the center line) and extend in a direction along the axis 12. The partition wall section 18 is disposed between the first cylinder section 14 and the second cylinder section 16. A circular opening section is formed on one end of the first cylinder section 14 in the direction along the axis 12. A column-shaped photoelectric conversion element package attachment concave section 14a is formed within the first cylinder section 14. A photoelectric conversion element package (for example, a package including a semiconductor light-emitting element or a semiconductor light-receiving element as the photoelectric conversion element) having a column-shaped cap section (not shown) is engaged within the photoelectric conversion element package attachment concave section 14a. The photoelectric conversion element package can be fixed within the photoelectric conversion element package attachment concave section 14a by adhesive or the like. At the same time, a circular opening section is formed on the other end of the second cylinder section 16 in the direction along the axis 12. A column-shaped optical fiber attachment concave section 16a is formed within the second cylinder section 16. A ferrule that holds the end section of the optical fiber (not shown) is removably fitted and held within the optical fiber attachment concave section 16a. A column-shaped concave section 16b having a smaller diameter than the optical fiber attachment concave section 16a is formed in the center section of the bottom surface of the optical fiber attachment concave section 16a (surface on the lens 20 side) to prevent the end section of the optical fiber held in the ferrule from contacting the optical module holder 10 and becoming damaged. The shape of the bottom surface of the concave section 16b (surface on the lens 20 side) does not necessarily have to be planar. The surface can be concave or convex, as long as the optical coupling between the optical fiber and the photoelectric element can be properly performed. In other words, the optical surface of an aspherical surface can be formed on the bottom surface of the concave section 16b.

The partition wall 18 is thicker than the first cylinder section 14 and the second cylinder section 16. A circular collar section 18a is formed on the outer circumference of the partition wall 18, in a position that is a predetermined distance away from the first cylinder section 14. A circular concave section 18b is formed between the collar section 18a and the first cylinder section 14.

A lens 20 (for example, an aspherical lens) is formed integrally in the center section of the surface of the partition wall 18 on the photoelectric conversion element package side. The lens 20 protrudes toward the photoelectric conversion element package (not shown) attached within the first cylinder section 14. The lens 20 is formed so that the optical axis of the lens 20 is aligned with the axis 12 of the optical module holder 10 (particularly the axis of the optical fiber attachment concave section 16a).

Figure 1C:
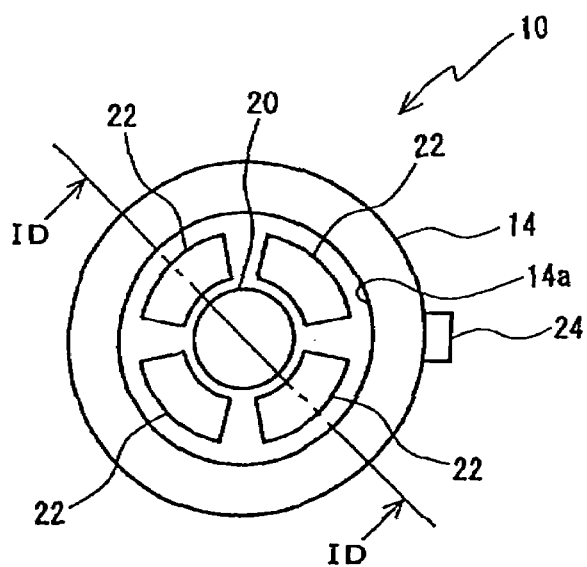
FIG. 1C is a bottom view of the optical module holder in FIG. 1C.
Figure 1D:
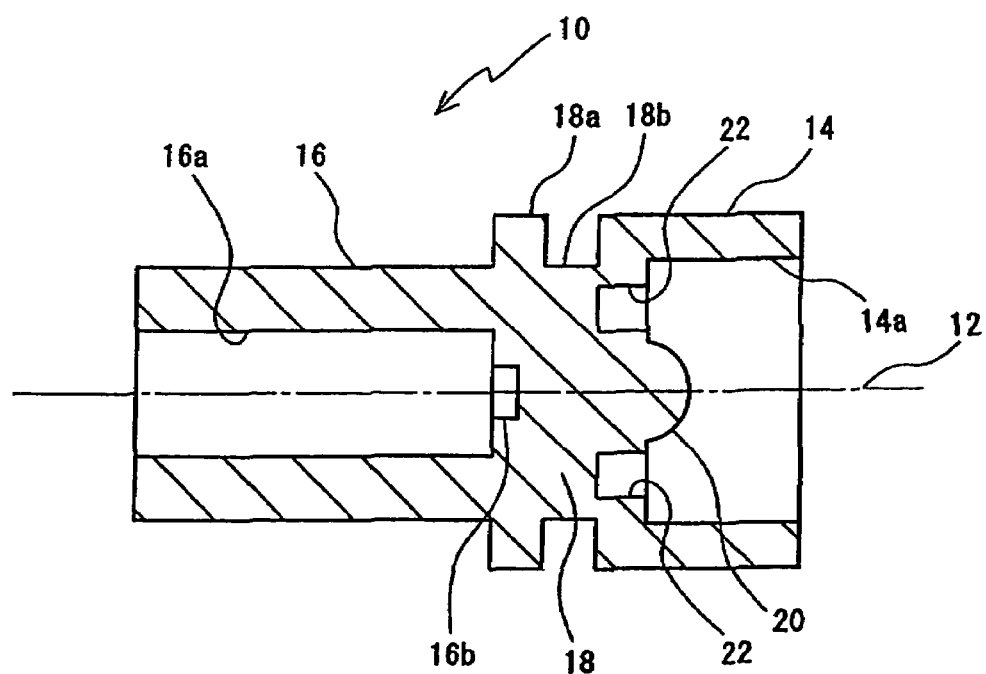
FIG. 1D is a cross-sectional view taken along line ID to ID in FIG. 1C.
Figure 2A:
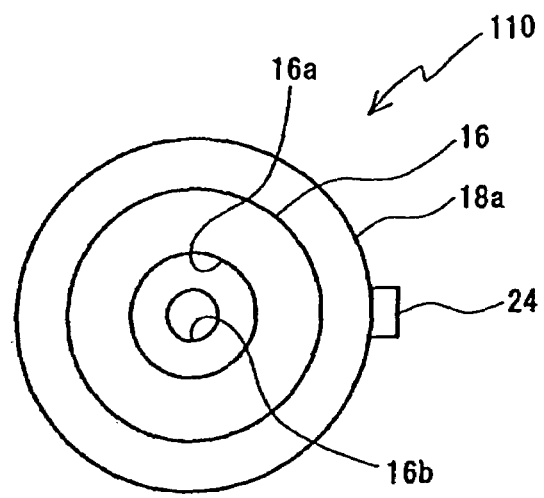
FIG. 2A is a planar view an optical module holder in which a grooved section is not formed, for comparison with the optical module holder in FIG. 1A.
Figure 2B:
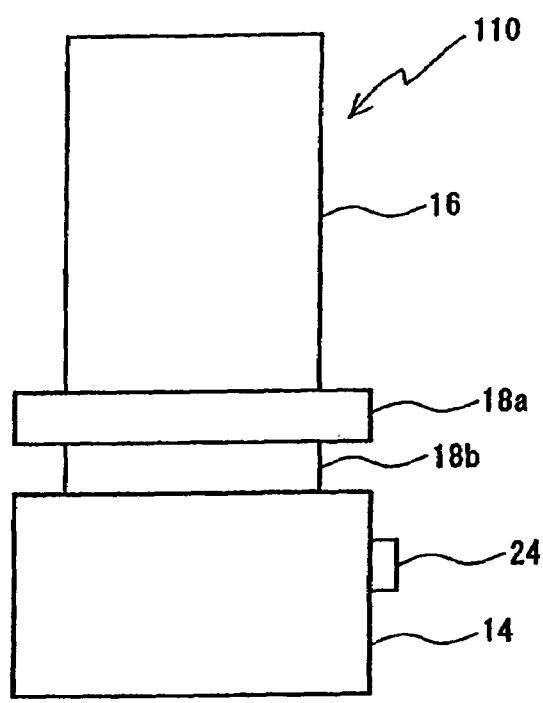
FIG. 2B is a side view of the optical module holder in FIG. 2A.
Figure 2C:
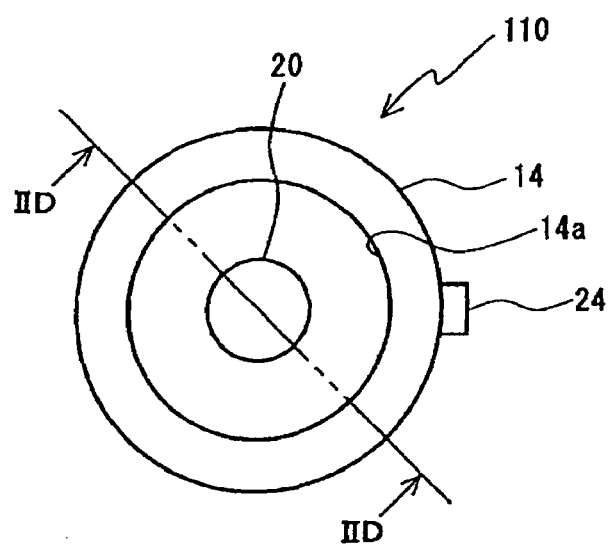
FIG. 2C is a bottom view of the optical module holder in FIG. 2A.
Figure 2D:
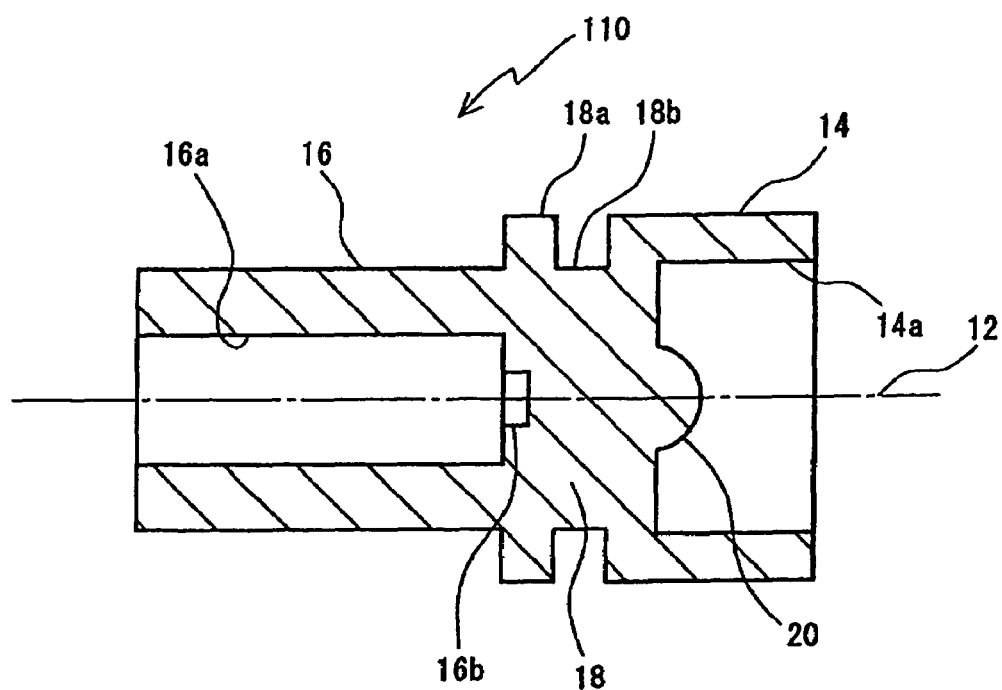
FIG. 2D is a cross-sectional view taken along line ID-ID in FIG. 2C.

In addition, a plurality (four in the present embodiment) of (fan-shaped in the present embodiment) concave sections (grooved sections) 22 having the same size and depth is formed on the partition wall 18. The concave sections 22 are formed so as to surround the lens 20 from a predetermined distance away from the lens 20. These concave sections 22 are disposed a predetermined distance apart from each other, symmetrical to the optical axis of the lens 20 and in the circumference direction of the lens. The concave section 22 is preferably formed to surround the lens 20. For example, the concave section 22 can be one circular concave section formed to surround the lens 20 or a plurality of concave sections placed a predetermined distance apart from each other. In the present embodiment, as shown in FIG. 1C, the concave section 22 is disposed so as not to face a resin injecting opening 24.

When an aspherical lens is respectively formed in the optical module holder 10 according to the present embodiment and an optical module holder 110 as the lens 20, and a simulation is performed regarding the occurrence of weld lines and air traps when resin material is injected from the resin injecting opening 24 and molded, it becomes clear that there are few weld lines and air traps in both cases. The optical module holder 110 has the same configuration as the optical module holder 10 other than the concave section 22 not being formed, as shown in FIG. 2A to FIG. 2D.

In addition, in the optical module holder 10 according to the present embodiment and the optical module holder 110 in which the concave section 22 is not formed, when a simulation is performed regarding a maximum volume shrinkage rate when resin material is injected from the resin injecting opening 24 and molded, the maximum volume shrinkage rate of the optical module holder 110 in which the concave section 22 is not formed is 3.477 to 3.646%, in areas other than near the resin material injecting opening 24 (near the gate). The maximum volume shrinkage rate of the optical module holder 10 according to the present embodiment is 3.300 to 3.477%, in areas other than near the resin material injecting opening 24 (near the gate). From the result of the simulation, it is clear that the maximum volume shrinkage rate of the thick section can be reduced, the shrinkage rate of the overall optical module holder 10 can be made closer to being even, and the distortion in areas contributing to optical performance, such as the lens 20 and the inner circumference of the second cylinder section (optical fiber attachment cylinder section) 16, can be reduced by the concave section 22 being provided, as in the optical module holder 10 according to the present embodiment.

Such reduction in the maximum volume shrinkage rate becomes more certain by the plurality (four in the present embodiment) of concave sections 22 being formed equal distances apart in the circumference direction of the lens 20.

Furthermore, it is preferable that the concave section 22 is formed with a good positional balance in this way, in terms of maintaining mechanical strength of the optical module holder 10.

In the optical module holder 10 according to the present embodiment and the optical module holder 110 in which the concave section 22 is not formed, when a maximum temperature is simulated when the resin material is injected from the resin injecting opening 24 and molded, the maximum temperature of the optical module holder 110 in which the concave section 22 is not formed is 254.000 to 259.333° C., in areas other than near the resin injecting opening 24 (near the gate). The maximum temperature of the optical module holder 10 is 248.667 to 254.000° C., in areas other than near the resin injecting opening 24 (near the gate). From the result of the simulation, it is clear that the maximum temperature of the thick section can be reduced and cooling time can be shortened by the concave section 22 being provided as in the optical module holder 10 according to the present embodiment.

Figure 5A:
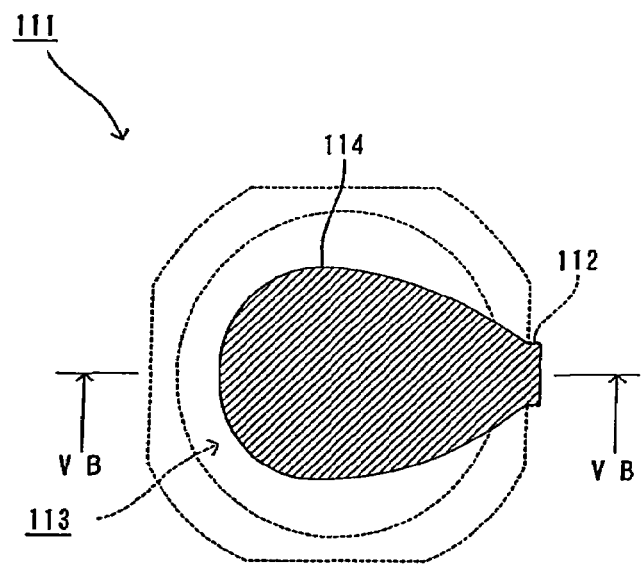
FIG. 5A is an explanatory diagram showing the flow of resin material within a mold when the optical module holder in which no grooved section is formed is injection-molded.
Figure 5B:
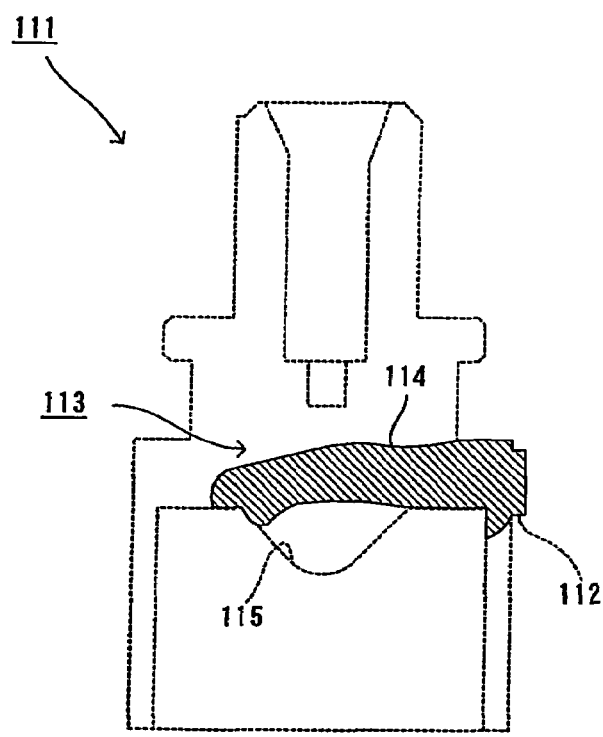
FIG. 5B is a cross-sectional view taken along line VB-VB in FIG. 5A.

Here, as a reason for the occurrence of the weld lines or the air traps in the lens 20, it is considered that a phenomenon occurs in which the resin material 114 that is injected into a cavity 113, via a gate 112 of a mold 111 that molds the optical module holder 110, fills the inside of a lens die 115 while returning in the direction opposing the injection direction after having once passed over the lens die 115, as shown in FIG. 5A and FIG. 5B.

Due to such a phenomenon, air is more easily enclosed within the lens die 115, thereby increasing the possibility of the occurrence of air traps. In addition, the resin material 114 that fills the lens die 115 while moving in the direction opposing the injection direction, as shown in FIG. 5B, and the resin 114 that fills the lens die 115 immediately after the injection into the cavity 113 join from mutually opposing directions within the lens die 115. Therefore, the possibility of the occurrence of weld lines increases.

The occurrence of such weld lines and air traps is considered to becomes particularly prominent when the injection speed of the resin into the cavity is increased so that there is no insufficient filling of the resin within the cavity even when the gate is small, under requirements at the stage of modularization, such as the gate being made small to smoothly attach the optical module holder within the housing and the outer circumference of the optical module holder being formed in a near perfect circle.

Figure 6A:
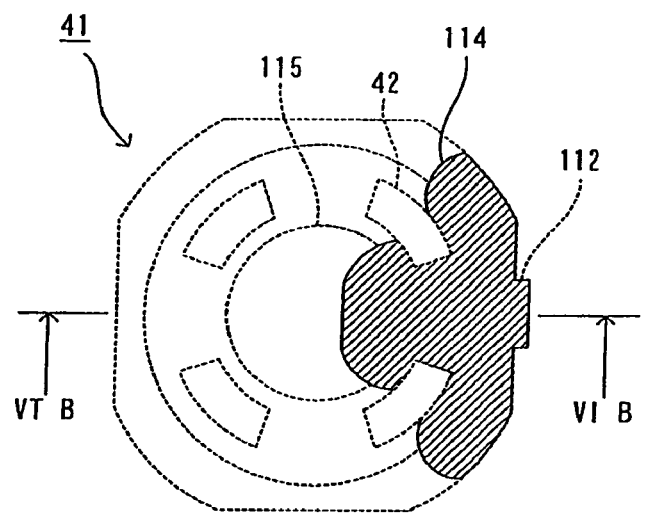
FIG. 6A is an explanatory diagram showing the flow of resin material within a mold when the optical module holder according to the embodiment is injection-molded.
Figure 6B:
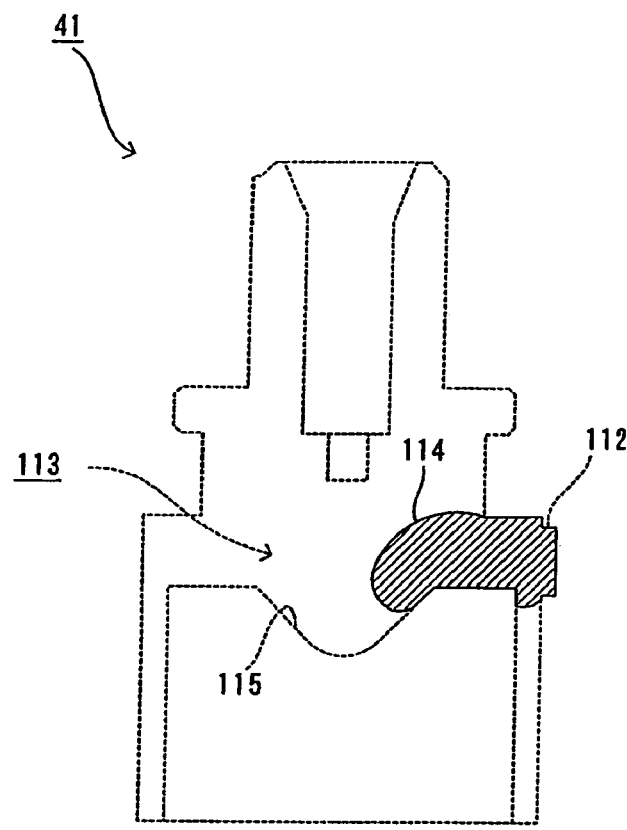
FIG. 6B is a vertical cross-sectional view of the mold shown in FIG. 6A taken along the lines VT B-VI B.

In the optical module holder 10 according to the present embodiment, the speed of the resin material 114 can be reduced, even when the injection speed of the resin material 114 is fast, by making the resin material collide into a region 42 in the mold 41 in which the concave section 22 is formed, as shown in FIG. 6A and FIG. 6B, because the concave section 22 is formed on the optical module holder 10. As a result, most of the resin material 114 fills the inside of the lens die 115 from one direction (gate 112 side) in the radial direction of the lens die 115. Therefore, the occurrence of weld lines or air traps can be suppressed.

Furthermore, the amount of freedom regarding the molding conditions (mainly the injection speed of the resin material) is increased, and productivity improvements, such as facilitated fabrication, can be made.

Therefore, the optical module holder 10 according to the present embodiment is not affected by the weld lines and air traps. In addition, the distortion in areas contributing to optical performance, such as the lens 20 and the inner circumference of the second cylinder section (optical fiber attachment cylinder section) 16, can be reduced. Production time can be shortened and production costs can be reduced since the cooling time can be shortened. Moreover, the production cost can be further reduced since the amount of resin material can be reduced by the amount required for the concave section 22.

In addition, in the optical module holder 10 of the present embodiment, the lens 20 is formed integrally. Therefore, it is unnecessary to match the position of the optical axis of the lens 20 and the axis 12 of the holder 10. The assembly of the optical module is facilitated, and the productivity of the optical module can be enhanced. Furthermore, the number of components in the optical module can be reduced, and the productivity can be enhanced. Therefore, the price of the optical module can be reduced.

Figure 7A:
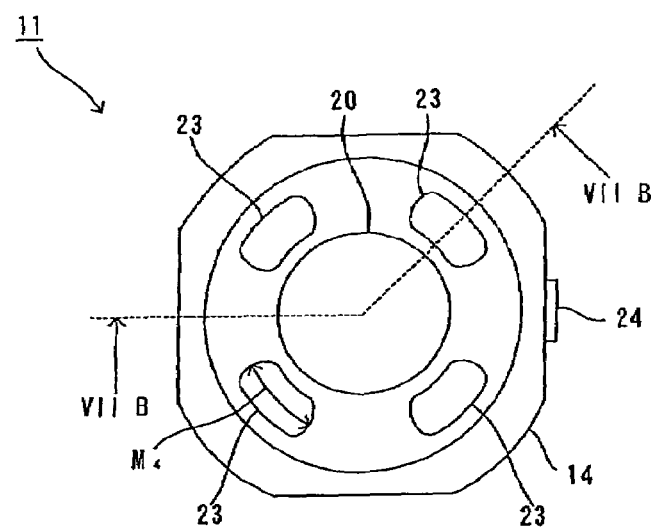
FIG. 7A is a bottom view of a first example of the optical module holder according to the first embodiment of the present invention.
Figure 7B:
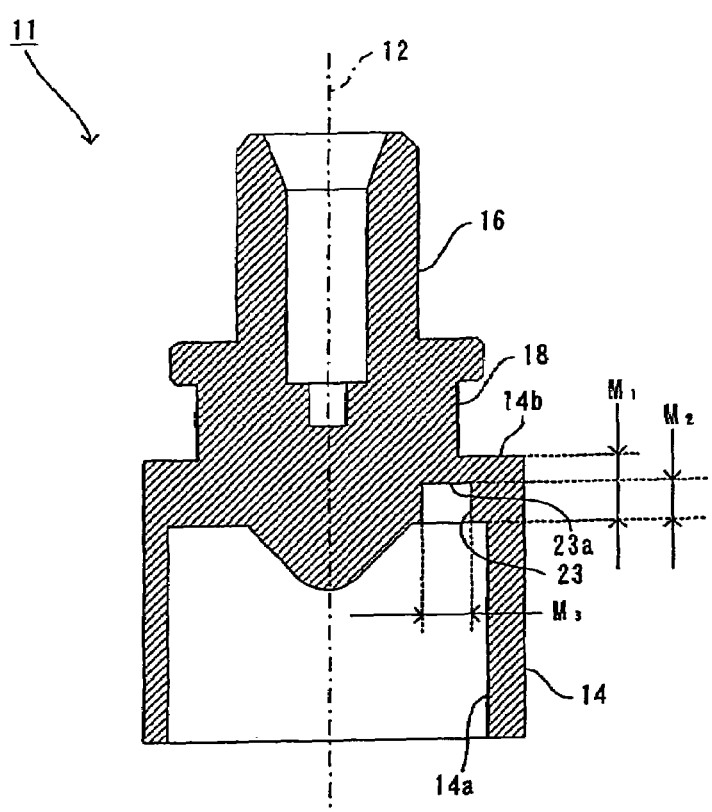
FIG. 7B is a cross-sectional view taken along line VIIB-VIIB in FIG. 7A.

FIG. 7A and FIG. 7B show a variation example of the first embodiment. As shown in FIG. 7A, a following optical module holder 11 can be used as the optical module holder according to the present embodiment. In the optical module holder 11, four fan-shaped concave sections 23 are formed an equal distance apart in the circumference direction of the lens 20, in positions outside of the lens 20, in the radial direction. The radii of the four fan-shaped concave sections 23 are formed in the four corners.

Even the optical module holder 11 shown in the first variation example can achieve the superior effects of the optical module holder 10 shown in FIG. 1A to FIG. 1D.

Furthermore, as shown in FIG. 7B, when the length from a bottom surface 23a of the concave section 23 to the end surface 14b on the partition wall section 18 side of the first cylinder section 14 is $M_1$ [mm], the depth of the concave section 23 (the length in the axis 12 direction, namely the optical axis direction) is $M_2$ [mm], and the length of the concave section 23 in the radius direction of the lens 20 is $M_3$ [mm], it is preferable that the following expressions (1) to (4) are satisfied:

$$0.2 \leq M_1 \leq 5 \quad (1)$$

$$0 < M_2 \leq 5 \quad (2)$$

$$0.1 \leq M_3 \leq 3 \quad (3)$$

$$0.2 \leq M_1 + M_2 \leq 10 \quad (4)$$

When the above expressions are satisfied, further reduction in the maximum volume shrinkage rate and further enhancement of mechanical strength can be achieved.

As shown in FIG. 7A, when the plurality of concave sections 23 are formed an equal distance apart in the circumference direction of the lens 20, it is preferable that each concave section 23 satisfies the following expression (5):

$$0.1 \times L \leq M_4 \leq 0.2 \times L \quad (5)$$

where, L in the expression (5) is the length of the inner circumference surface of the photoelectric conversion element concave section 14a in the circumference direction of the lens 20. In addition, $M_4$ in the expression (5) is the length of the center section of the concave section 23 in the radius direction of the lens 20, in the circumference direction of the lens 20, as shown in FIG. 7A. It is more preferable that the value of $M_4$ is 0.15×L.

In this way, it becomes possible to further reduce the maximum volume shrinkage rate and further enhance the mechanical strength.

Figure 8:
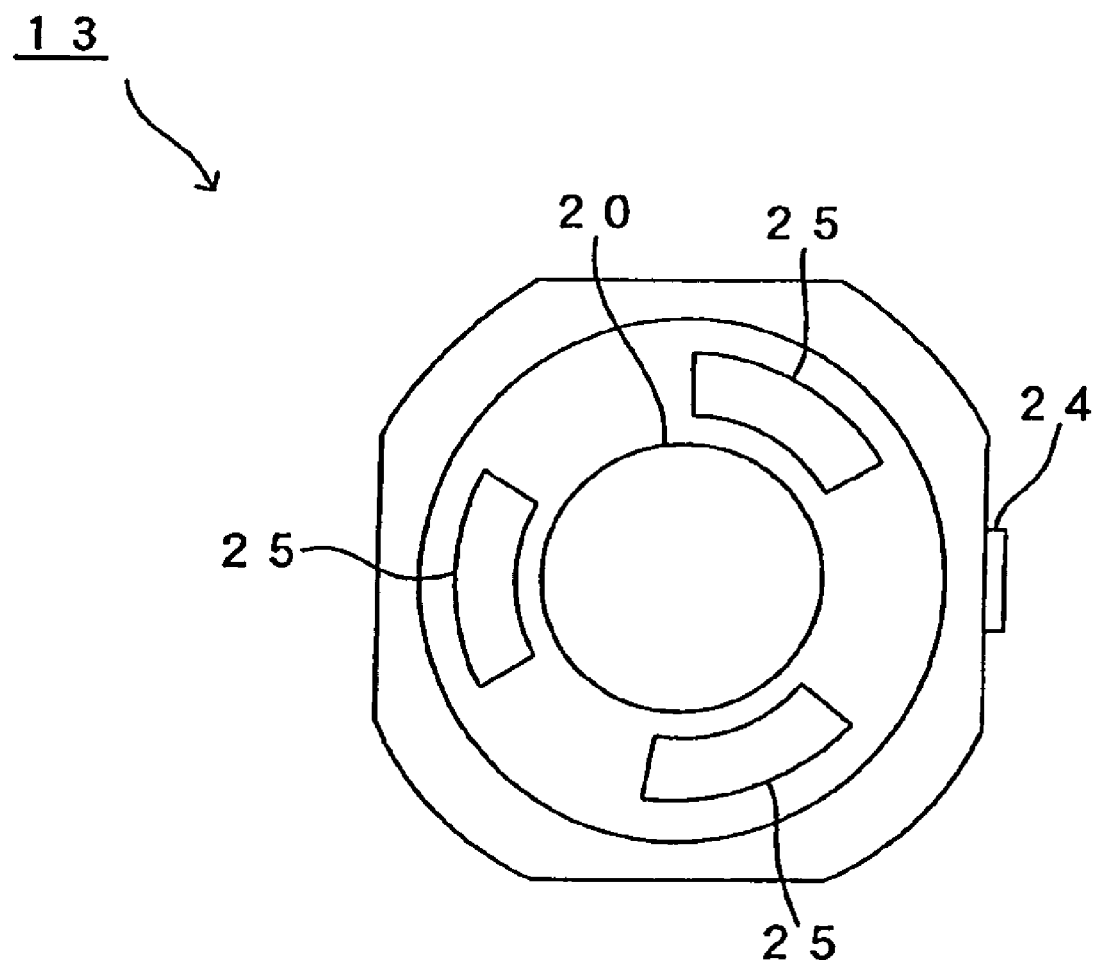
FIG. 8 is a bottom view of a second example of the optical module holder according to the first embodiment of the present invention.

FIG. 8 is a second variation example of the present embodiment. As shown in FIG. 8, an optical module holder 13 can be implemented as the optical module according to the present embodiment. The optical module holder 13 is formed in a position outside of the lens 20, in the radial direction. Three fan-shaped concave sections 25 are formed an equal distance apart in the circumference direction of the lens 20.

Even the optical module holder 13 shown in the second variation example can achieve the superior effects of the optical module holder 10 shown in FIG. 1A to FIG. 1D. It goes without saying that the optical module holder 13 can satisfy each of the above-mentioned expressions (1) to (5).

Second Embodiment

Next, a second embodiment of the optical module holder according to the present invention will be explained in detail.

Components having the same or similar basic configuration as those in the first embodiment are given the same reference number and described.

Figure 9A:
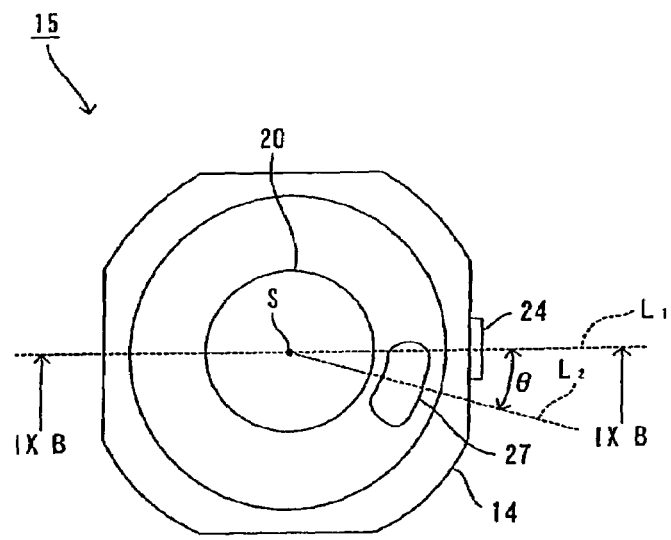
FIG. 9A is a bottom view of an optical module holder according to a second embodiment of the present invention.
Figure 9B:
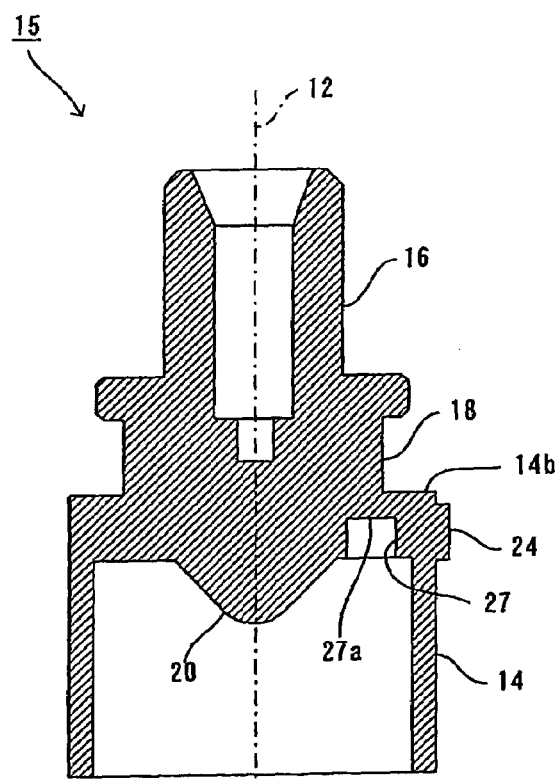
FIG. 9B is a cross-sectional view taken along line IXB-IXB in FIG. 9A.

FIG. 9A and FIG. 9B show the second embodiment of the optical module holder according to the present invention. An optical module holder 15 according to the present embodiment is formed integrally, as in the first embodiment, by injection molding of resin material. The optical module holder 15 compresses the first cylinder section 14, the second cylinder section 16, and the partition wall section 18.

However, in the optical module holder 15 according to the present embodiment, the formation position of the concave section (grooved section) differs from that in the first embodiment.

In other words, as shown in FIG. 9A, the g concave section 27 (grooved section) according to the present embodiment is disposed in a position facing the resin injecting opening 24 (namely the area formed within the gate) in the immediate vicinity of the resin injecting opening 24. The distance between the concave section 27 and the resin injecting opening 24 is shorter than that in the first embodiment.

As a result, the speed of the resin material injected into the cavity can be quickly reduced. Therefore, the filling of the lens die with resin material can be optimized, and weld lines or air traps can be further effectively suppressed.

For example, when the concave section is formed completely facing the resin injecting opening 24, in the immediate vicinity of the resin injecting opening 24, namely when the concave section is formed directly in front of the resin injecting opening 24, the flow of the resin material injected in to the cavity may be divided into two after the collision with the area in the mold in which the concave section is formed. As a result, there is risk of the occurrence of weld lines or air traps due to the subsequent joining of the divided resin material within the lens die.

Therefore, it is preferable that the concave section 27 is formed, not in a position completely facing the resin injecting opening 24, but in a position that is misaligned with the resin injecting opening 24 by a predetermined amount in the circumference direction of the lens 20, as shown in FIG. 9A.

It is more preferable that the amount of misalignment of the formation position of the concave section 27 to the resin injecting opening 24, in the circumference direction of the lens 20, satisfies the following expression (6):

$$5° < \theta \leq 35° \quad (6)$$

where, θ in the expression (6) is an angle formed by a bisector L1 that passes through the center S of the lens 20 and bisects the resin injecting opening 24 in the circumference direction of the lens 20 and a bisector L2 that passes through the center S of the lens 20 and bisects the concave section 27 in the circumference direction of the lens 20. It is more preferable that the value of θ is 20°.

In the present embodiment, deformation of the second cylinder section 16 due to the pressure of the resin or shrinkage can be suppressed by the formation of the concave section 27 near the resin injecting opening 24. Then, the ferrule can be appropriately fixed in the optical fiber attachment concave section 16a, and a high coupling-efficiency can be maintained.

Also, in the present embodiment, each expression (1) to (4) can be satisfied between the length $M_1$ [mm] from a bottom surface 27a of the concave section 27 to the end surface 14b on the partition wall section 18 side of the first cylinder section 14, the depth $M_2$ [mm] of the concave section 27 (the length in the axis 12 direction), and the length $M_3$ [mm] of the concave section 27 in the radius direction of the lens 20.

The shape of the concave section 27 is fan-shaped in which the four corners are formed like circular arc. However, The four corners of a fan-shaped need not be formed like the circular arc.

Figure 10:
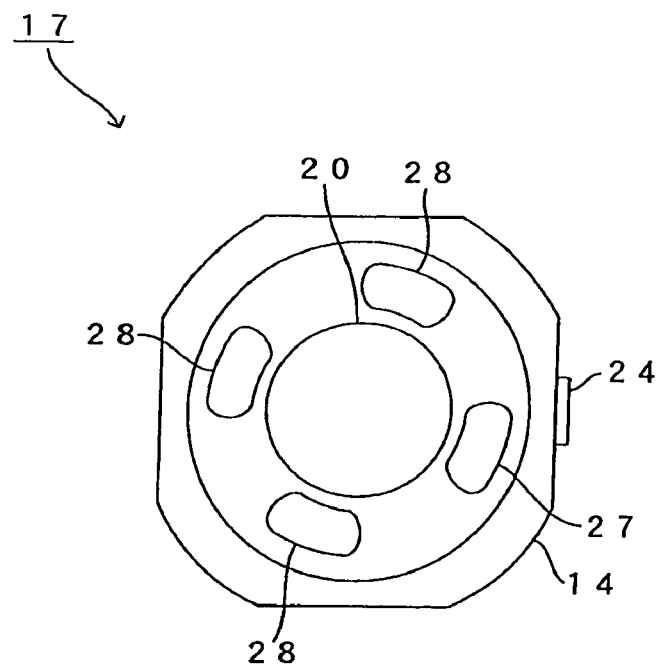
FIG. 10 is a bottom view of a first example of the optical module holder according to the second embodiment of the present invention.

Next, FIG. 10 shows a first example of the present embodiment. As shown in FIG. 10, a following optical module holder 17 can be used as the optical module holder according to the present embodiment. In the optical module holder 17, the above-described concave section 27 is formed in a position facing the resin injecting opening 24, and three other concave sections 28 having the same shape as the concave section 27 are formed so that each concave section 27 and 28 is formed an equal distance apart in the circumference direction of the lens 20.

Figure 11:
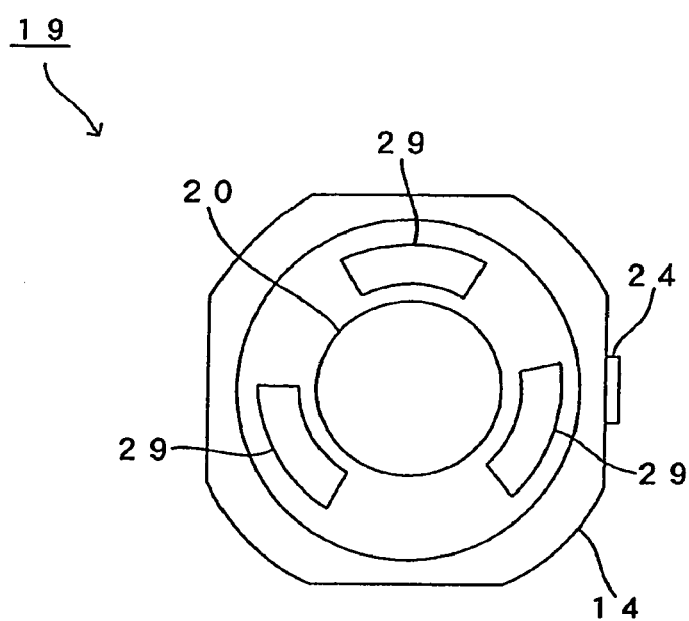
FIG. 11 is a bottom view of a second example of the optical module holder according to the second embodiment of the present invention.

FIG. 11 shows a second example of the present embodiment. As shown in FIG. 11, a following optical module holder 19 can be used as the optical module holder according to the present embodiment. In the optical module holder 19, three fan-shaped concave sections 29 are formed an equal distance apart in the circumference direction of the lens 20, so that one concave section 29 among the three concave sections 29 is formed facing the resin injecting opening 24 in the immediate vicinity of the resin injecting opening 24. In this case, it goes without saying that each expression (1) to (6) can be satisfied.

Even the optical module holders 17 and 19 showing each variation example can achieve the superior effects of the optical module holder 15 shown in FIG. 9A and FIG. 9B.

The optical module holder according to the present invention is not limited to the above-described embodiments, and various modifications are possible as required. For example, in the above-described embodiment, the concave section 22 is formed on the surface of the partition wall section 18 on the photoelectric conversion element package side, so as to surround the lens 20. However, as long as the concave section is formed so as to surround the lens 20, the concave section can be formed on a surface of the partition wall section 18 other than the surface on the photoelectric conversion element package side. In addition, in the above-described embodiment, the lens 20 is formed in the center section of the partition wall section 18. However, the lens 20 can be disposed in an appropriate position other than the center section of the partition wall section 18. Furthermore, when a plurality of concave sections are formed, the shape of one concave section can differ from the shape of at least one of the other concave sections.

Figure 3:
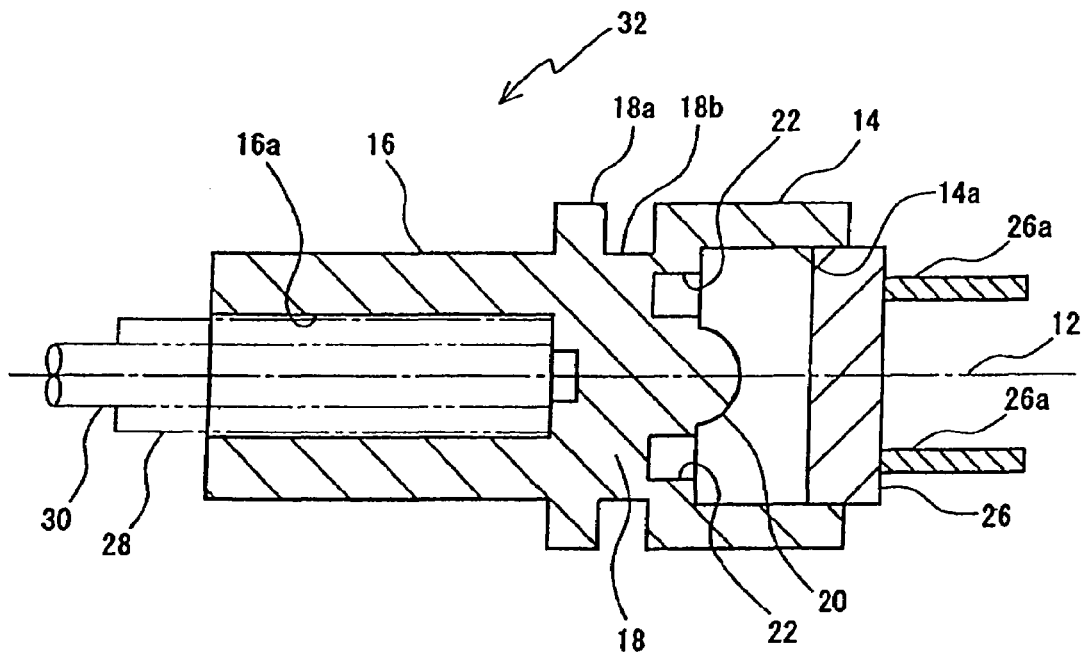
FIG. 3 is a cross-sectional view of an embodiment of an optical module using the optical module holder according to the present invention.
Figure 4:
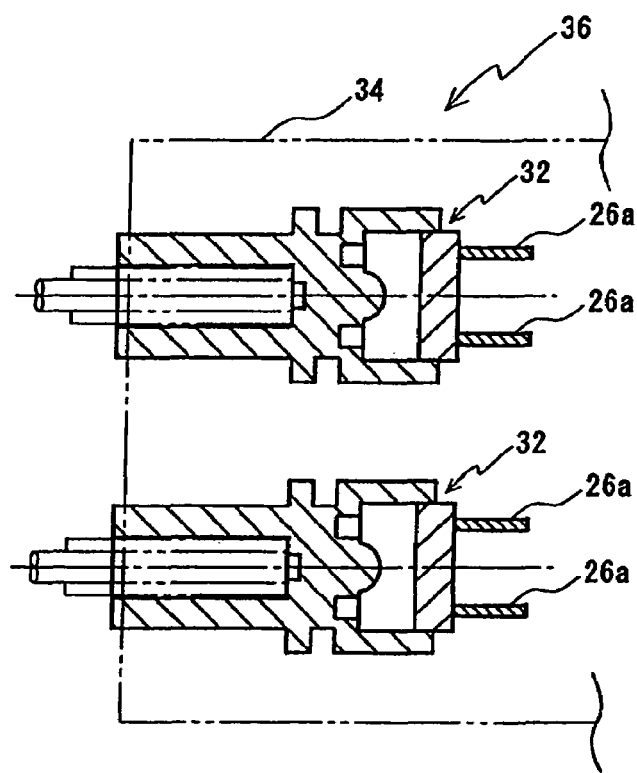
FIG. 4 is a diagram schematically showing an embodiment of an optical connector using the optical module according to the present invention.

As shown in FIG. 3, when the photoelectric conversion element package 26 is attached to the photoelectric conversion element package attachment concave section 14a of the optical module holder 10 according to the above-described embodiment, an optical module 32 can be manufactured. The optical module 32 can convert the optical signal from the optical fiber 30 attached to the optical fiber attachment concave section 16a, via the ferrule 28, to an electrical signal or convert the electrical signal to the optical signal. In addition, as shown in FIG. 4, an optical connector 36 can be formed as follows. The optical module 32 for light emission, to which a light-emitting element is attached, and the optical module for light reception, to which a light-receiving element is attached, are held within a housing 34. Lead wires 26a of the light-emitting element and the light-receiving element are soldered onto a circuit board (not shown) within the housing 34.

What is claimed is:

1. An optical module holder in which an optical transmission line attaching section for attaching an end section of a light transmission line, a photoelectric element attaching section for attaching a photoelectric element including at least one of a light-emitting element or a light-receiving element, and a wall section connecting the optical transmission line attaching section and the photoelectric element attaching section are formed integrally, and a lens for optically joining the photoelectric element and the optical transmission line is formed integrally with the wall section, so that a convex surface of the lens is on the photoelectric element side, facing the photoelectric element attached to the photoelectric attaching section, wherein:

at least one concave section is formed as a grooved section on the wall section so as to surround the lens.

2. The optical module holder according to claim 1, wherein said optical transmission line attaching section and said photoelectric attaching section are formed from cylindrical components that mutually extend in the same axis direction, and said wall section is formed from a discoid component that is axially thicker than said cylindrical components of said optical transmission line attaching section and said photoelectric element attaching section.

3. The optical module holder according to claim 1, wherein said lens is formed in a center area of said wall section, and said concave section is formed a predetermined distance away from the lens.

4. The optical module holder according to claim 1, wherein said concave section is a plurality of sections disposed a predetermined distance apart from each other, symmetrical to the optical axis of said lens and in the circumference direction of said lens.

5. The optical module holder according to claim 1, wherein said concave section is a plurality of roughly-fan-shaped sections or one circular section.

6. An optical module comprising the optical module holder according to any one of claims 1 to 5 and a photoelectric element attached to said optical module holder.

7. An optical connector comprising the optical module according to claim 6 and a housing holding said optical module.

* * * * *